Feb. 27, 1962     C. J. PITT     3,022,582
TIME TEACHING EDUCATIONAL DEVICE
Filed May 20, 1960
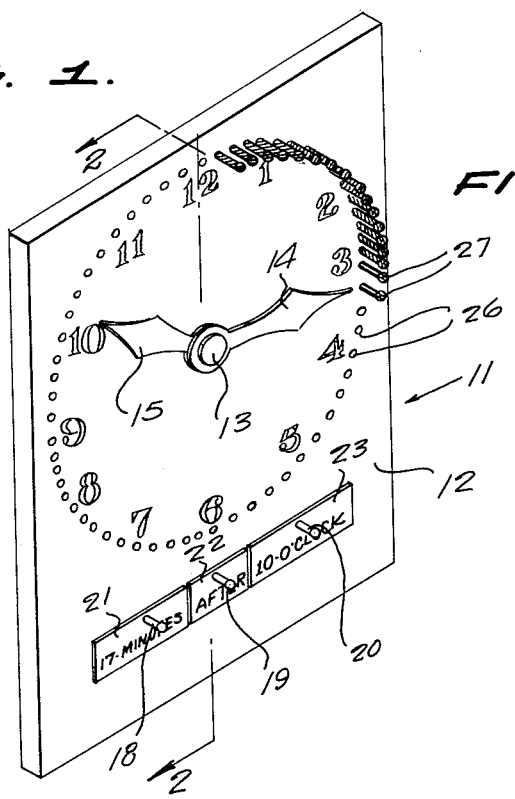
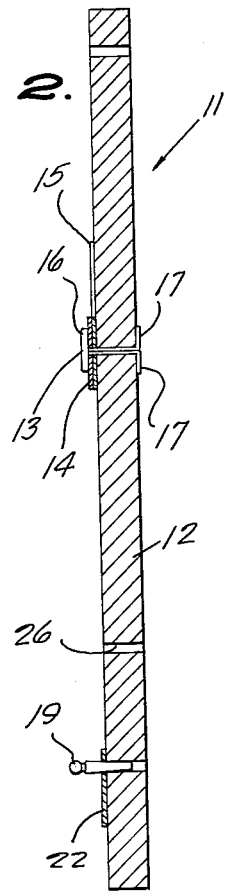
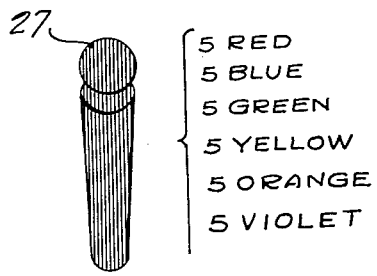
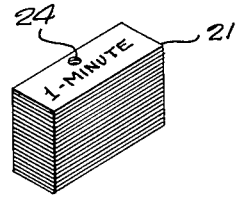
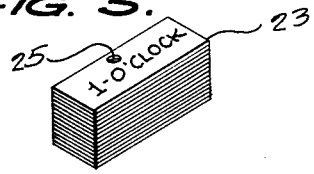
INVENTOR.
CATHERINE J. PITT,
BY
McMorrow, Berman & Davidson
ATTORNEYS.

United States Patent Office 3,022,582
Patented Feb. 27, 1962

3,022,582
TIME TEACHING EDUCATIONAL DEVICE
Catherine J. Pitt, 1606 15th Ave., Menominee, Mich.
Filed May 20, 1960, Ser. No. 30,607
1 Claim. (Cl. 35—39)

This invention relates to educational devices, and more particularly to an apparatus for teaching the concepts involved in telling time.

A main object of the invention is to provide a novel and improved educational device for teaching pupils how to tell time, the device being simple in construction, being easy to operate, and providing a convenient and effective means for illustrating the concepts involved in telling time and for facilitating practice exercises with respect to these concepts.

A further object of the invention is to provide an improved educational device for teaching the concepts involved in telling time, the apparatus being inexpensive to fabricate, being compact in size, being durable in construction, and being attractive in appearance.

Further objects and advantages of the invention will become apparent from the following description and claim, and from the accompanying drawings, wherein:

FIGURE 1 is a perspective view of an educational apparatus according to the present invention, shown in use.

FIGURE 2 is an enlarged vertical cross sectional view taken substantially on the line 2—2 of FIGURE 1.

FIGURE 3 is a perspective view of a typical colored peg employed with the apparatus of FIGURES 1 and 2, and indicating the specific quantities of pegs of the various different colors employed with the apparatus.

FIGURE 4 is a perspective view of one of the groups of time-indicating cards, specifically, the group indicating minute values, employed with the apparatus of FIGURES 1 and 2.

FIGURE 5 is a perspective view of another group of time-indicating cards, specifically, the group indicating the hour values, as employed with the apparatus of FIGURES 1 and 2.

Referring to the drawings, 11 generally designates an educational device constructed in accordance with the present invention. The device 11 comprises a board of any suitable shape, for example, rectangular shape as illustrated, shown at 12, adapted to be vertically mounted for example, on a vertical wall or other suitable supporting surface. The board 12 is inscribed with a circularly arranged succession of spaced numerals from 1 to 12, separated by the same angles as in a conventional clock dial, whereby the numerals correspond to the respective hour numerals on the face of a clock. Pivotally mounted centrally of the series of hour numerals at 13 are the respective minute and hour hands 14 and 15 which are manually movable to indicate various time values, the pivotal connection at 13 comprising a fastener of a conventional type which holds the minute and hour hands 14 and 15 with sufficient friction so that they will remain at the manually adjusted settings thereof until manually readjusted. The member 13 may comprise, for example, a conventional fastener or rivet having the large front head 16 and the oppositely bent rear prongs 17, 17 which hold the fastener in position.

Mounted on the board below the simulated clock face are respective outwardly projecting pegs 18, 19 and 20 adapted to receive respective time-indicating cards 21, 22 and 23. Thus, the time-indicating cards 21 are inscribed with minute values and are provided with apertures 24 centrally located in their top marginal portions to receive the supporting peg 18. The hour indicating cards 23 are physically similar to the minute indicating cards 21 but are inscribed with hour values. The cards 23 are likewise provided with apertures 25, similar to the apertures 24, and being adapted to receive the supporting pegs 20. One or more intermediate cards 22 may be provided, since the board may be inscribed adjacent the peg 19 with the designation "before," and the card 22 may merely be inscribed with the designation "after" so that it may be mounted on the peg 19 to cover the subjacent normal designation. As will be readily apparent, by the provision of the cards 21, 22 and 23, any time designated by the minute and hour hands 14 and 15 may be described by a proper arrangement of cards.

The intermediate card 22 is provided with a suitable supporting aperture in which the peg 19 is receivable, as in the case of the cards 21 and 23.

The board is provided with circularly arranged additional apertures 26 spaced to indicate minute values between the successive numerals, and further pegs 27 are provided engageable in the apertures 26. The additional pegs 27 comprise groups of five each, each group being of one particular color, so that respective groups are provided five of each color, with each particular color corresponding to the minute intervals between a particular pair of adjacent hour numerals on the face of the simulated clock dial. The additional pegs 27 are provided in order to familiarize pupils with the concepts of five minute intervals between each successive pair of numerals, since a specific peg may be inserted in an aperture 26 to correspond with each minute interval between a pair of successive hour numerals.

In using the device, the student places the pegs 27 in the apertures 26 up to and including the position occupied by the minute hand 14, so that by counting the pegs the student will obtain the exact minute value indicated by the minute hand 14. The student can thereafter show the exact time value by properly selecting the cards 21 and 23 for engagement on the pegs 18 and 20 and by suitably employing the card 22 if such is required.

Obviously, if so desired, two separate cards 22 may be provided, one card having the designation "before" and the other card having the designation "after."

The minute cards 21 are in sequence from "1 minute" to "30 minutes," thirty cards 21 being provided. The hour cards 23 are in sequence from "1 o'clock" to "12 o'clock," twelve hour cards 23 being provided.

While a specific embodiment of an improved educational device for teaching the concepts involved in telling time has been disclosed in the foregoing description, it will be understood that various modifications within the spirit of the invention may occur to those skilled in the art. Therefore, it is intended that no limitations be placed on the invention except as defined by the scope of the appended claim.

What is claimed is:

A time teaching educational device of the character described comprising a board inscribed with a circularly arranged succession of twelve numerals corresponding to the numerals on the face of a clock, respective minute and hour hands pivotally mounted on said board centrally of the numerals and being manually movable to indicate various time values, three horizontally aligned spaced pegs secured on the board adjacent said circular arrangement of numerals, a pair of groups of time indicating cards formed with supporting apertures respectively engageable on the two outer pegs, one group of cards comprising minute values and the other group of cards comprising hour values, the board being inscribed with a first sequence designation subjacent the intermediate peg, an additional card having a supporting aperture engageable on said intermediate peg and being of sufficient size to cover said first sequence designation, said additional card being inscribed with a sequence designation opposite in meaning to said first sequence designation, said board being formed with circularly arranged apertures located to indicate respective minute values in groups of five apertures between the successive numerals, and further pegs detachably engageable in said last-named apertures, said further pegs comprising groups of five each, said groups of pegs being of different colors to teach the concept of five minutes between each successive pair of numerals.

References Cited in the file of this patent

UNITED STATES PATENTS

| | | |
|---|---|---|
| 2,539,077 | Hawkins | Jan. 23, 1951 |
| 2,837,838 | Lewis | June 10, 1958 |

FOREIGN PATENTS

| | | |
|---|---|---|
| 580,471 | Great Britain | Sept. 9, 1946 |